T. L. VALERIUS.
ART OF MANUFACTURING ICE CREAM.
APPLICATION FILED JULY 6, 1908.

916,067.

Patented Mar. 23, 1909.
3 SHEETS—SHEET 1.

T. L. VALERIUS.
ART OF MANUFACTURING ICE CREAM.
APPLICATION FILED JULY 6, 1908.

916,067.

Patented Mar. 23, 1909.
3 SHEETS—SHEET 2.

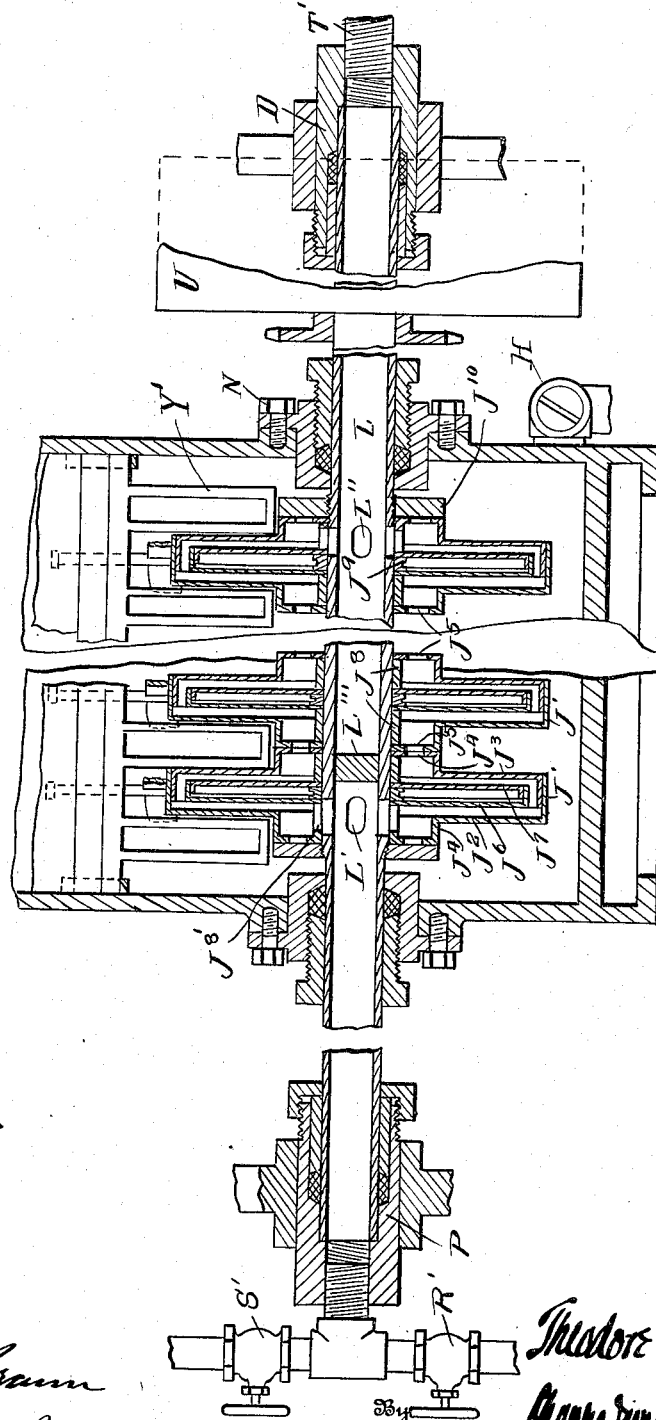

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ART OF MANUFACTURING ICE-CREAM.

No. 916,067.      Specification of Letters Patent.      Patented March 23, 1909.

Application filed July 6, 1908. Serial No. 442,241.

*To all whom it may concern:*

Be it known that I, THEODORE L. VALERIUS, a citizen of the United States, and a resident of Fort Atkinson, county of Jefferson and State of Wisconsin, have invented certain new and useful Improvements in the Art of Manufacturing Ice-Cream, of which the following is a full, clear, and exact description, such as will enable others skilled in the art to practice said improvements.

My invention relates to improvements in the art of manufacturing ice cream, sherbets and the like and the object of my invention is to enable the continuous and rapid production of commercial ice cream of the best grade or quality.

My invention will be more readily understood by reference to the accompanying drawings in which I have illustrated an ice cream freezer or apparatus of a form which I find to be best suited to the performance of my novel process or improvement in the art of manufacturing ice cream.

Figure 1:
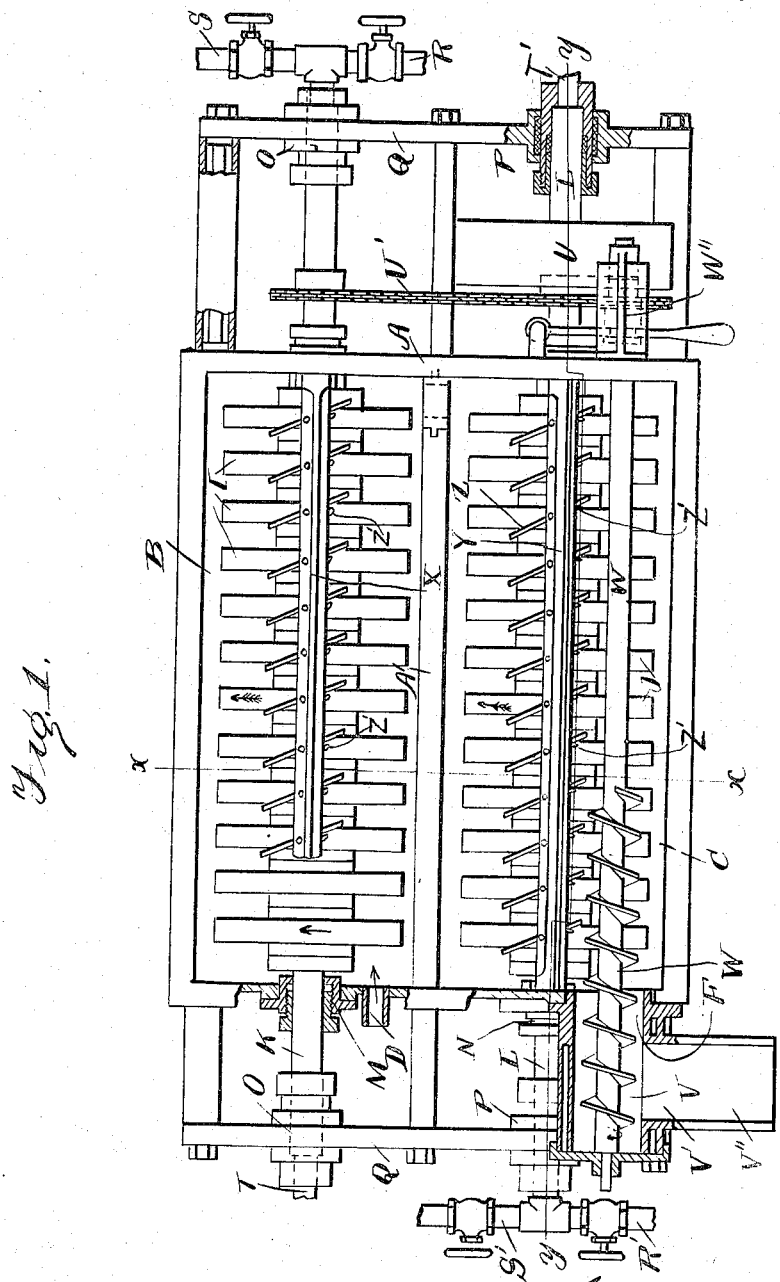
Figure 2:
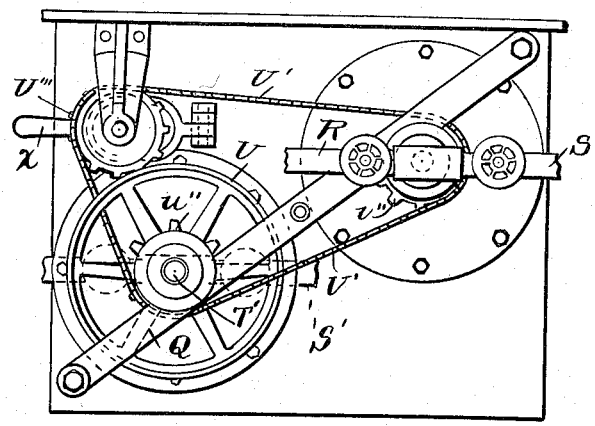
Figure 3:
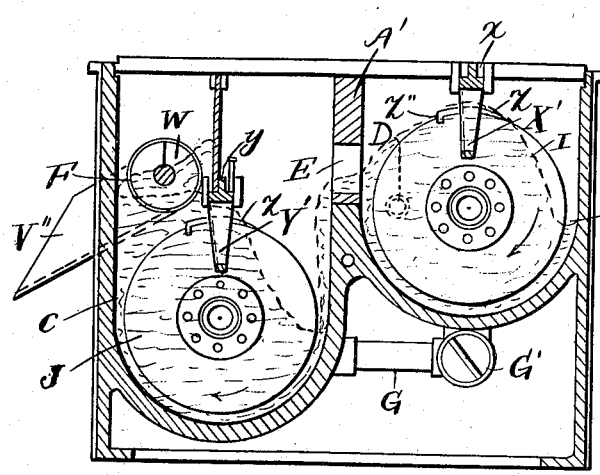

In said drawings Figure 1 is a plan view of the ice cream freezer or apparatus. Fig. 2, is an end view of the apparatus showing the driving mechanism. Fig. 3, is a vertical section on the line $x$—$x$ Fig. 1, and Fig. 4, is a vertical, enlarged section on the line $y$—$y$ Fig. 1.

I will first describe this apparatus and then particularly define and describe my novel process of manufacturing ice cream with the aid thereof.

Referring to the drawings, the body portion, A, of the freezer or apparatus, contains two parallel trough-like vessels B and C, the bottom of the latter being at a lower level than the bottom of the former. The arrangement of the troughs and the general construction of the body are well shown in Figs. 1 and 3, from which it will be seen that the vertical walls of the troughs or vessels rise to the same level although the bottoms of the troughs are preferably at different levels. The bottoms of the vessels are preferably semi-cylindrical. The liquid to be frozen is admitted to the upper vessel, B, through a pipe or spout D. The flow of liquid is controlled by any suitable means (not shown) and while the machine is in operation is continuous. From the first or upper vessel B the liquid overflows into the lower vessel C, through a duct E, provided in the intermediate wall A'. The frozen or semi-frozen liquid is removed or discharged from the lower vessel through an opening F, provided at or near the top thereof at the end opposite the duct E.

G represents a drain by-pass containing a valve G', by which the contents of the upper vessel may be drawn off into the lower vessel, after the supply of liquid has been cut off and before the apparatus is stopped or shut down.

H represents the drain cock of the lower vessel by which the machine may be completely emptied preparatory to cleaning the same.

Within the troughs or vessels B and C, I arrange the freezing members I and J. These are of cylindrical form and are constructed or mounted upon respective hollow shafts K and L. The shafts rotate in suitably packed bearings, M and N in the ends of the vessels. The ends of the shafts K and L are also held in stationary stuffing boxes O, P, arranged in frame-work Q, on the ends of the body A. At that end of the shaft K which is remote from or opposite the liquid inlet D, a connection is provided for supplying freezing fluid to the hollow shaft and to the refrigerating device or cylinder mounted thereon. This connection is a valved pipe R, which enters the stuffing box C. The freezing fluid is supplied thereto by suitable means, not shown, such as a brine tank and circulating pump.

S represents a valved steam pipe which joins the brine connection; to the end that the temperature of the member I may be raised when it is necessary to remove frozen or caked liquid therefrom, and also for the purpose of sterilizing the member I after the apparatus has been washed. The brine or other freezing fluid leaves the member I through a return pipe T connected with the other stationary stuffing box O.

E is the liquid inlet for the vessel C and at the opposite end of the shaft L, said shaft, or more specifically its stuffing box, P, is equipped with valved brine and steam connections S' and R'.

T' represents the outlet or return connection of the shaft L.

A driving pulley U is arranged on the shaft

L, and the shaft L and K are connected by a sprocket belt U' running over sprocket pulleys U'', fixed on said shaft. In the preferred construction the shafts are rotated at the same speed, as I find that the best results are obtained under such conditions.

At the end of the vessel C, I arrange a discharge head V. This is a continuation of the opening, F, and within it is a spiral conveyer W which extends or reaches into the upper part of the vessel C. The conveyer shaft W' is mounted in suitable bearings, and is provided with a sprocket wheel U''', operated by the belt U'.

W'' represents a clutch mechanism for connecting the sprocket U''' with the shaft whereby the rotation of the conveyer W may be controlled to effect or stop the discharge of frozen liquid from the apparatus.

It will be noted that the head V is provided with discharge opening V', in its side, through which the frozen liquid is gently discharged upon an inclined shelf or spout V'' whence the frozen substance falls into a can or vessel to receive it.

X and Y represent longitudinal bars or partitions arranged in the vessels B and C above the rotary members therein. These carry a plurality of small individually adjustable scrapers Z for removing the partially frozen liquid from the peripheries of the freezing cylinder. The partition bars X and Y are provided with fixed scrapers or fingers X', Y', which occupy the annular grooves of the cylindrical members I and J and remove the freezing liquid from the sides of the disks comprising the same. Said fingers have the form of light frames or rectangles containing openings which permit the liquid to freely surge or circulate from side to side of the vessel, under the propulsion of the rotary members. Actual contact between the rotary member and the scraping devices is avoided, to preserve the metallic surfaces, but said devices so closely approach said surfaces as to effectually remove all but a very thin film, of frozen liquid from the rotating member. When the scrapers Z are lifted they may be freed and turned into opposite positions. Small screws Z' (indicated but not fully shown in Fig. 1) are preferably provided for accurately adjusting the scrapers Z with relation to the corresponding portions of the rotary members I and J. It will be noted that the scrapers have downwardly turned ends, Z'' which clear the corner surfaces of the cylinders. The scrapers occupy inclined or diagonal positions with respect to the axis of the rotary members and serve as deflectors, which according to position, either retard or accelerate the flow of liquid in respective vessels. The partitions X and Y are adapted for easy removal to facilitate the cleaning of the machine or apparatus.

The members I and J are preferably identical in form and construction, hence the description of one will serve for both. In Fig. 4, I have illustrated one of these members in such manner as to disclose its construction in detail. Broadly speaking it comprises a plurality of hollow disks or short cylinders J', which subdivide the freezing vessel into a number of connected spaces. These I employ with a view to increasing the refrigerating or chilling area of the rotary member and also for the purpose of increasing the efficiency of said member, as a means for refrigerating, agitating or mixing and aerating the custard under treatment.

Near its end the hollow shaft L is provided with two sets of openings or ports L' and L'', through which the freezing fluid is admitted to and discharged from the freezing member or cylinder. A plug L''' in the shaft L prevents the direct passage of the freezing fluid from end to end of the shaft and forces it to travel through the freezing member. Each hollow disk J', preferably comprises two interfitting flanged disks, $J^2$, $J^3$, each provided with a hub portion $J^4$. The ends of the hub portions contain openings $J^5$. The disks $J^2$ and $J^3$, are mounted upon the shaft L, and within the same are other interfitting disks $J^6$, $J^7$, which form a radial partition of less diameter, adapted to cause the freezing fluid to circulate upon the inner walls of the hollow disk J'. The inner disks are held and the outer disks are spaced by metal rings $J^8$, $J^8$ and $J^9$. The flanges of the disks $J^2$ and $J^3$, are united as by the process of brazing. The ends of the disk hubs are joined in like manner. Such is the construction throughout. The hollow disks are held by end pieces $J^{10}$, which being first tightly screwed onto the shaft are afterward soldered or brazed at all joints. The spacing rings $J^8$, at the ends of the device contain openings $J^{8'}$, corresponding to the ports L' and L'' in the hollow shaft. From the foregoing it will be understood that the freezing fluid enters the freezing member at the ports L' and passing into the first disk flows about the partition disk. Returning or flowing from the periphery of the partition or dividing disk to the hollow hub, the fluid passes into the next hollow disk J', and so on to the discharge end of the member when the fluid escapes through the ports L''. The flow of freezing fluid is constant; hence the rotary member is maintained at a temperature below freezing. The walls of the vessels B and C are exposed to the atmosphere and have no freezing function. This being the case the liquid will not freeze upon said walls and hence it is not necessary to provide means for scraping the inner surfaces of the vessels.

The operation of the apparatus herein shown and the steps making up my novel process are as follows: a driving belt (not shown) being placed upon the pulley U, the members I and J are started in rotation. The speed with which these members are rotated is relatively low approximating one hundred revolutions per minute in most cases. The freezing fluid valves are then opened and the fluid brine system being in operation, the freezing fluid will be circulated through the members I and J. The temperature of the refrigerating members is thus lowered to a point below freezing. The ice cream custard or like liquid to be frozen is continuously admitted to the vessel or trough B through a suitable regulator (not shown) connected with the inlet D. It will be noted that this inlet is at the opposite end from the outlet E and it will also be noted that the inlet D is remote from the point at which the freezing fluid enters the member I, and hence as the liquid moves toward the outlet E it approaches the coldest end of the member I, being subjected to the increasing refrigerative effect of the member I as it flows or moves from end to end thereof. The body of custard which quickly accumulates in the vessel B when the inlet D is opened to admit the custard partly submerges the member I, but never wholly submerges the same, for the reason that the outlet E is below the top of the rotating member I. The direction of rotation of the member I is indicated by the arrow on Fig. 1, of the drawings, and it will be observed that the side of the member I, which is adjacent to the outlet E, rotates upwardly, tending to elevate the custard slightly, and in actual operation the height of the partially frozen custard at the outlet E considerably exceeds its height at the receiving end of the trough or vessel. The disk portions of the member I, are of only slightly less diameter than the vessel B, and therefore the disks serves as partitions in the vessel and subdivide the body of custard into many smaller bodies, each of which is obviously subjected to the cooling effect of the adjacent disks. The disks prevent the rapid flow of the custard from the inlet to the outlet end of the vessel, and the flow or movement of the liquid is further retarded by the scrapers Z on the bar or partition X, which scrapers are adjusted to deflect the liquid or custard backwardly.

The partially frozen custard which overflows from the vessel B at the outlet E, falls into the vessel C and therein moves toward the discharge end, which latter contains the discharging device or conveyer W. As in the case of the upper freezing member, the custard which enters the lower vessel flows therein in a direction contrary to the flow of the freezing fluid in the member J, the coldest end of which is at the discharge end of the vessel C. The body of custard in the lower vessel C is acted upon by the refrigerating disks in the same manner as by the disks in the upper vessel, being subdivided and subjected to progressive refrigeration thereon and thereby up to the time that it reaches what may be termed the discharge end of the member J, i.e. the end thereof which is below the conveyer W. The member J rotates in the direction indicated by the arrow in Fig. 1, so that the side thereof which is below the conveyer rotates upwardly toward the same and tends to lift the frozen custard within reach of the conveyer. As the frozen custard in the vessel C is stiffer or thicker than the custard in the vessel B, it is necessary to adjust the scrapers Z in such manner as to force the custard forward toward the discharge end of the vessel, as indicated in Fig. 1. It will be obvious that the particles of custard which are frozen are lighter than the liquid parts of the custard and therefore float to the top. Being separated in this manner and elevated by the action of the member J, the custard which is ready to be discharged naturally rises within reach of the conveyer, which being in rotation gently scoops off and withdraws the frozen custard from the top or surface thereof at the discharge end of the vessel C. The ice cream thus gently withdrawn or floated out of the top of the vessel C is propelled into the tube or trough V. It is smoothed out by the conveyer and discharged upon the inclined spout V'.

The mechanical operation and functions of the freezer being now fully understood, I will further and more specifically explain the novel process which is conducted therein; proceeding on the assumption that the machine is already in operation with both vessels filled and with a continuous supply of custard at the inlet D. As before explained, the disks of the refrigerating members I and J subdivide the body of custard into a large number of small bodies, the particles composing each of which are subjected to the direct refrigerating action of the walls which inclose them. The relatively warm custard which enters at the inlet D falls into the first space or subdivision of the vessel B. Here it encounters the first disk of the member I. The freezing fluid having passed through the other disks of the member I, is warmest in the first disk; therefore, the fresh custard is not at first severely chilled, but nevertheless loses part of its heat. Thus the custard as it flows or moves from disk to disk loses part of its heat to each thereof, being gradually reduced to a low temperature, it being substantially true that no particle or small quantity of the custard is frozen at the first instant of its contact with the surface of the freezing member. From the foregoing it will be seen that the freezing operation is of a progressive nature. As before explained, the disks are only partially submerged in the liquid, and in their rotation they carry over thin films of custard.

The custard which congeals upon the surfaces of the disks is scraped off by the fingers which extend downwardly between them and by the angularly positioned scrapers X. The congealed or partly congealed quantities of custard are therefore returned to the vessel to be further acted upon by the chilled member. The disks in rotating in the custard do not violently agitate or heat the same, and for this reason and because of the progressive refrigeration of the liquid, the buttering of the custard, observed in other freezers, is wholly avoided. As the top of the vessel is open to the atmosphere, the air reaches all parts of the surface of the custard, resulting in the thorough aeration thereof. Furthermore, the custard which is elevated by the disks flows through and between the scraping fingers and scrapers Z, being divided into a large number of fine or thin streams which take up large quantities of air. The ice cream is, therefore, aerated and expanded by air in the best possible manner, and the air which is once taken up by the custard is not forced out of the same again, as in other freezers, because it is never subjected to shocks or to a beating action which would tend to deflate the custard or cream. The progressive agitation and refrigeration to which the custard is subjected in the vessel B, and which results in delivering it at the outlet in a partially frozen condition, is repeated in the vessel C, in which latter the freezing operation is completed.

One of the great advantages of my process follows upon the perfect separation which is made between the frozen and the unfrozen particles of cream by the combined action of gravity and the elevating or lifting action of the rotating disks, it being evident that the frozen particles will always rise or float upon the more liquid portion of the custard. It is because of this that only the completed product is carried away by the conveyer W, which operates in the continuously forming mound of ice cream which piles against the partition Y at the discharge end of the vessel C. The conveyer works in the top of the vessel C, extending part way across the same. It therefore works continuously in the body of ice cream, and smooths or refines it while pushing, scooping or floating it toward the outlet F, and this process is continued in the discharge trough V. Solid masses of cream are never removed by the conveyer, for the reason that the conveyer prevents the formation of a mass of cream at the discharge end of the freezing vessel. It follows, therefore, that the tube or trough V is never more than partially filled with ice cream, and the latter is discharged into the spout V'' in small quantities or layers and without being subjected to pressure, which would deflate or compress the product.

A further and special advantage of my machine is that all parts thereof operate within the sight of the attendant, in other words, the process is carried on under the eyes of the operator, and he may therefore see and test the ice cream in its several stages of manufacture and is thus enabled to accurately control the operation of the machine and determine the quality of its product.

Having thus fully described my invention what I claim as new and desire to secure by Letters Patent is:—

1. The herein described improvement in the art of manufacturing ice cream and the like which consists in subdividing a moving body or stream of custard into a plurality of connected bodies, subjecting these bodies to successively lower temperatures in the direction of flow, simultaneously mixing and agitating the custard, permitting the frozen and partially frozen product to rise to the surface of the body of liquid custard, causing the same to move in the direction of flow and continuously removing the finished product from the last of the connected bodies of custard, substantially as described.

2. The herein described improvement in the art of manufacturing ice cream and the like that consists in subdividing a body of liquid custard into a plurality of bodies connected throughout at the surface, causing movement of said bodies, subjecting the same to successively lower temperatures, mixing, agitating and smoothing the custard and frozen product, permitting the frozen product to rise to the surface of the liquid custard and removing the same therefrom, substantially as described.

3. The herein described improvement in the art of manufacturing ice cream and the like that consists in subdividing a stream or moving body of custard into a plurality of connected bodies, exposing the surface of the custard to air, subjecting the same to successively lower temperatures in the direction of flow, simultaneously agitating and subdividing the bodies of custard into many transversely moving and falling streams and continuously removing the finished product from the surface of the liquid custard, substantially as described.

4. The herein described improvement in the art of manufacturing ice cream and the like which consists in maintaining a stream of custard in an open vessel, subdividing the same into a plurality of bodies connected in the direction of flow, subjecting these to successively lower temperatures in the direction of flow, also subjecting the custard to agitation and transverse subdivision upon and above the surface of the custard, causing the frozen product to progress on said surface in the direction of flow and gently removing the finished product from the surface of the last body of custard, substantially as described.

5. The herein described improvement in the art of manufacturing ice cream which consists in maintaining a moving body or stream of custard in a vessel having its top open to atmosphere, subdividing the same into a plurality of bodies connected at the surface in the direction of flow, subjecting said bodies to successively lower temperatures in the direction of flow, subjecting them also to transverse agitation and subdivision in the presence of air above the surface of the custard, causing the finished product to progress in the direction of flow and skimming the finished product from the surface of the liquid custard, substantially as described.

6. The herein described improvement in the art of manufacturing ice cream that consists in establishing and maintaining a moving body or stream of custard, subjecting each particle thereof to successive refrigeration, simultaneously mixing and smoothing the same by transverse movement about the axis of the body, permitting the frozen product to rise upon the surface of the custard and finally skimming the finished product therefrom, substantially as described.

7. The herein described improvement in the art of manufacturing ice cream that consists in establishing and maintaining a moving body or stream of custard, subjecting the custard to internal progressive refrigeration in the direction of flow, transversely agitating and admixing the partially frozen custard with the liquid custard, permitting the finished product to rise to the surface and skimming the same therefrom, substantially as described.

In testimony whereof, I have hereunto set my hand, this 25 day of May, 1908, in the presence of two subscribing witnesses.

THEO. L. VALERIUS.

Witnesses:
   I. R. HIPPENMEYER,
   H. J. KELLOGG.